United States Patent [19]

Jones

[11] 4,224,499
[45] Sep. 23, 1980

[54] LASER WELDING ALUMINUM TO COPPER

[75] Inventor: Marshall G. Jones, Scotia, N.Y.

[73] Assignee: General Electric Company, Schenectady, N.Y.

[21] Appl. No.: 953,019

[22] Filed: Oct. 20, 1978

[51] Int. Cl.$^2$ .................................................. B23K 27/00
[52] U.S. Cl. .............................. 219/121 LM; 219/118
[58] Field of Search ............. 219/121 L, 121 LM, 118

[56] References Cited
U.S. PATENT DOCUMENTS
3,121,785  2/1964  Terrill et al. .......................... 219/118

*Primary Examiner*—C. L. Albritton
*Attorney, Agent, or Firm*—Donald R. Campbell; James C. Davis; Marvin Snyder

[57] ABSTRACT

Copper and aluminum conductors are butt welded or corner welded by a two-part process involving heating and melting the Cu-Al interface with energy from a pulse laser and simultaneously generating a contact pressure. The laser wavelength is 1.06 micrometers or less and a single 8 millisecond pulse is used. Brittle intermetallics are found in the flash but the narrow fusion zone in the weld is substantially free of intermetallics. High conductivity aluminum is successfully welded to electrolytic tough pitch (ETP) copper wire.

6 Claims, 2 Drawing Figures

LASER WELDING ALUMINUM TO COPPER

BACKGROUND OF THE INVENTION

This invention relates to a process for welding together aluminum and copper, and especially to the butt and corner welding of aluminum and copper conductors using a pulse laser.

To weld aluminum to copper without obtaining a brittle joint has been an inherent metallurgical problem; this brittleness results from the formation of intermetallic compounds which are inherently brittle themselves. One area where a copper to aluminum weld is employed is in small ac motors. A cold welded copper to aluminum transition piece, in series between the conductors, is presently being used to join aluminum wound stator coils to copper power leads. One method of making the transition joint is by flash welding. The surfaces of the mating materials are metallurgically bonded by a high forging pressure produced by force and the speed of approaching surfaces during current arcing. Elimination of the transition piece and direct joining of the coil leads to the power leads would represent a savings in labor and materials.

SUMMARY OF THE INVENTION

The method of making welded butt joints and corner joints between aluminum and copper conductors comprises the steps of butting together the conductors with a contact pressure of about 100-350 psi and, while maintaining the contact pressure, delivering a single laser pulse to the aluminum-copper interface having a pulse width of approximately 8 milliseconds, a wavelength of 1.06 micrometers or less, and sufficient energy to heat and melt metal adjacent the interface. Molten material is forced outwardly into a flash containing brittle intermetallics but the narrow fusion zone is substantially free of intermetallics.

The laser source is preferably a neodymium YAG (yttrium aluminum garnet) or neodymium glass laser whose beam is focused to a small spot at the copper-aluminum interface. This laser has a wavelength of 1.06 micrometers. Special surface preparation of the conductor ends is not required, specifically grinding flat and square is not a prerequisite, and there can be a small space between the conductor ends. Good quality joints as indicated by strength, electrical resistance, and microprobe tests have been made between butt welded high conductivity aluminum conductors and electrolytic tough pitch (ETP) copper conductors.

DESCRIPTION OF THE PREFERRED EMBODIMENTS

Figure 1:
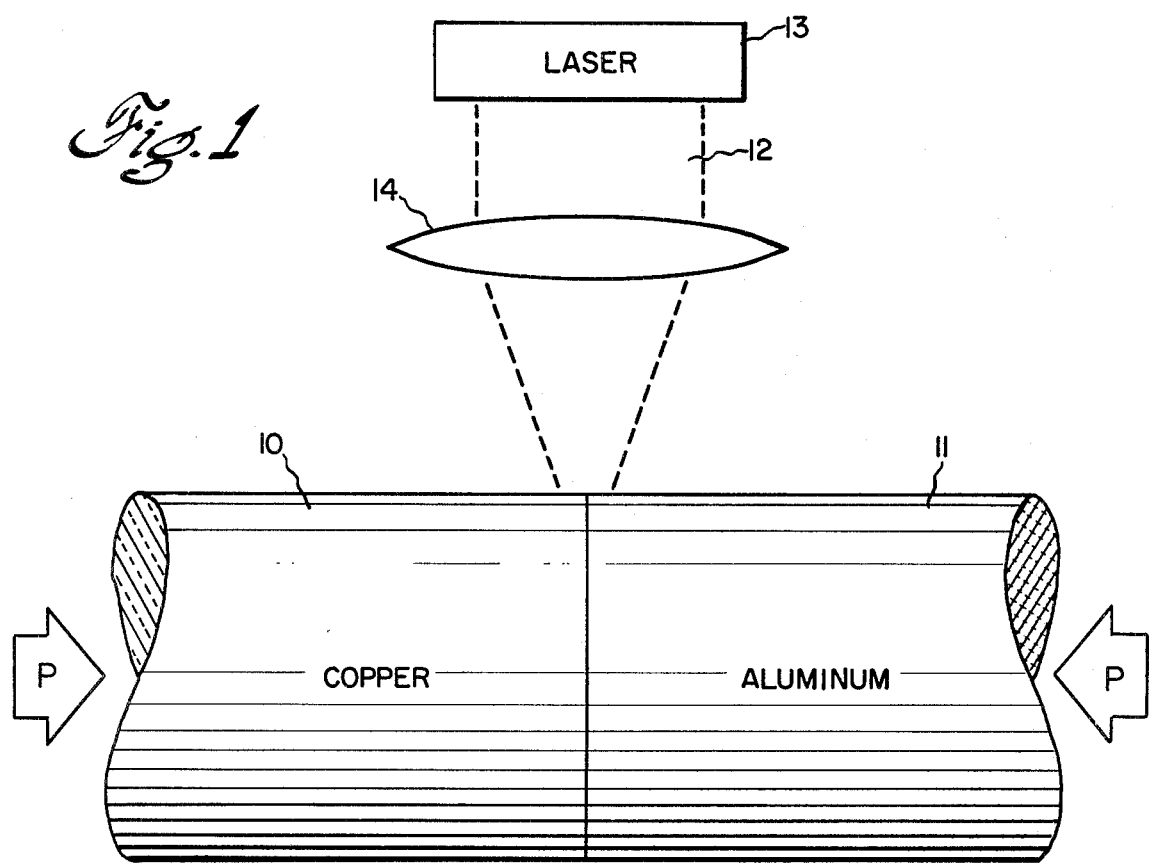
FIG. 1 is a simplified schematic diagram of apparatus for the laser welding of aluminum and copper conductors under controlled contact pressure.

Conventional welding of electrolytic tough pitch (ETP) copper usually produces poor results because of the presence of dissolved cuprous oxide, $Cu_2O$. This electrical grade copper possesses a 0.04 percent impurity level of oxygen which enhances the conductivity, and this is due to the oxidation of those impurities which decrease conductivity. This oxygen is scattered homogeneously throughout the base material and makes a good weld almost impossible. When the base metal is heated to its melting point, oxygen is precipitated to the grain boundaries and forms $Cu_2O$. The cuprous oxide coats each grain, making it more difficult for the heat to penetrate, and the oxide also breaks down the bonding between the grains and causes a reduction in strength of the fusion-welded zone. Diffusion of oxygen is primarily due to the long times necessary to raise the temperature of copper to the melting point by conventional welding methods. Migration of oxygen to the grains boundaries is prevented by heating ETP copper for shorter times, and such short times are achievable with pulse laser heating.

Aluminum is an excellent substitute for copper when weight, electrical properties, and cost are considered. It is a good alternative to copper conductor in electrical apparatus such as lighting ballasts and ac machines. In ac motors, the stator coils are made of aluminum wire but it is required that the power leads be made of copper. When welding aluminum to copper, brittle joints usually occur because of the formation of intermetallics. Copper-aluminum is a binary metal system and it shows some solubility in the solid state. At equilibrium at least five intermetallic compounds can be identified in the copper-aluminum system, and these are $\theta(CuAl_2)$, $\eta(CuAl)$, $\zeta(Cu_4Al_3)$, $\delta(Cu_3Al_2)$, and $\gamma(Cu_2Al)$. Brittleness of joints is a function of the thickness of the intermetallics. Embrittlement is minimized and the over-all strength of the joint is unaffected as long as the layer thickness of intermetallics does not exceed 0.001 millimeter.

The direct welding of copper conductors and aluminum conductors to make a butt joint or corner joint is achieved with a two-part process. The two parts are heating and melting the copper-aluminum interface with energy from a pulse laser and simultaneously generating a contact pressure. The laser is a neodymium-doped yttrium aluminum garnet (YAG) or neodymium glass laser with a wavelength of 1.06 micrometers which is operated in pulsed mode. This small wavelength is not highly reflective and is readily absorbed by both aluminum and copper. Another laser source that can be employed in the direct welding process is a ruby laser with a wavelength of 0.69 micrometers operated in pulsed mode. The $CO_2$ laser is not suitable for this process because both metals are highly reflective to the longer 10.6 micrometers radiation of this laser source. Since the wavelength of the neodymium YAG and glass lasers are essentially the same, their operating characteristics are similar with the YAG type having the advantage of faster pulse rates which is required for manufacturing conditions. A weld is made by a single laser pulse, and another critical laser operating parameter is that the pulse width (or pulse length) is approximately 8 milliseconds. Intermetallics are sensitive to temperature and grow if given a long time to do so, but with a relatively short pulse there is no growth of the intermetallics. The 8 millisecond pulse width is the optimum value for welding aluminum and copper. A shorter pulse tends to vaporize the material and drill a hole rather than weld, and with a longer pulse the material conducts heat away faster than it is put in.

A third laser operating parameter is that the pulse energy in joules is sufficient to heat and melt metal adjacent the copper-aluminum interface. In the specific example given later, the pulse laser energy is 40 joules. Whereas a monochromatic radiation wavelength not exceeding 1.06 micrometers and a pulse width of about 8 milliseconds are requisites for all conductor sizes, the amount of laser energy required changes with the conductor size, being less for smaller conductors. An energy balance equation for estimating the energy, q, is given in the paper "Laser Welding Cu-Cu and Cu-Al Conductors" given by the inventor at the Industrial Applications of Laser Conference, Electro-optics/-Laser Exposition 78, Sept. 19-21, 1978. This paper was published in the Proceedings.

Figure 2:
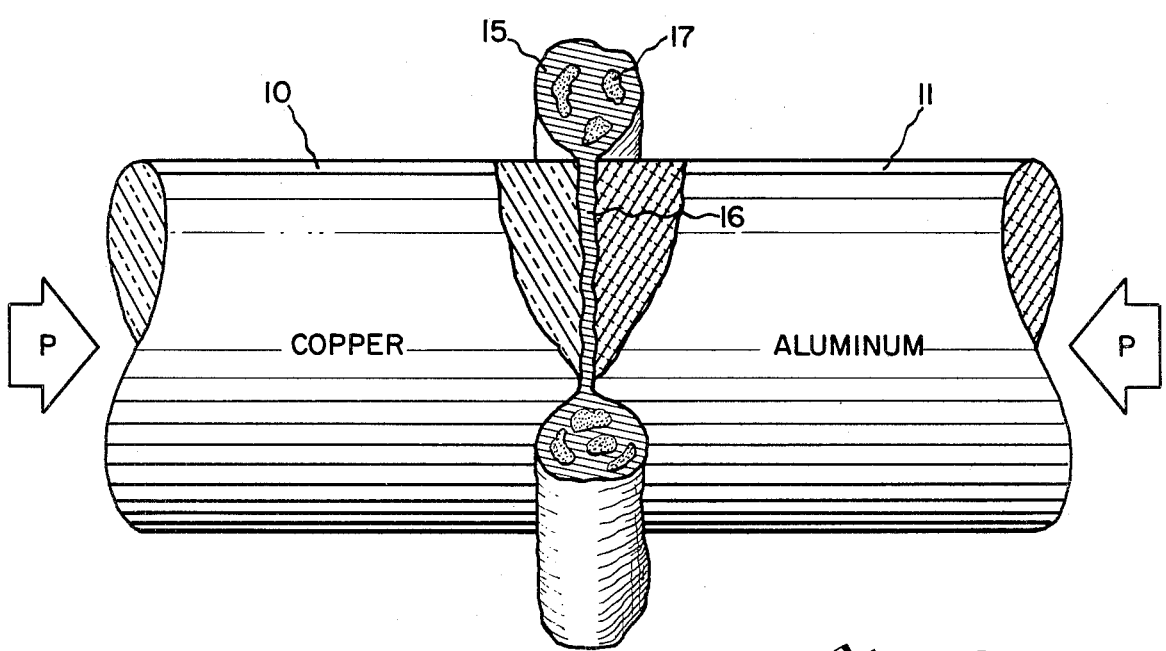
FIG. 2 shows a laser welded copper-aluminum joint with the fusion zone and flash in section.

Referring to FIG. 1 which illustrates the direct laser welding of copper and aluminum conductors 10 and 11 to make a butt joint, a laser beam 12 generated by pulse laser 13 is focused by lens 14 to a small spot centered on the copper-aluminum interface. Special surface preparation such as grinding of the conductor ends is not required and there can be a small space between abutted ends not exceeding 5 percent of the conductor diameter. It is permissible to trim the wires with a chisel nose pliers since perfect flatness is not essential. The contact pressure P is developed by butting the copper and the aluminum conductors under a contact load and is between 100 and 350 lbs/in$^2$. Contact pressures of less than 100 psi resulted in poor quality joints, and values above 350 psi approach forging pressures and are not necessary. While maintaining the contact pressure, the laser pulse is delivered to the copper-aluminum interface, which creates a light pipe effect and increases absorption efficiency. Metal adjacent the interface is heated and melted, and most of the melted material is forced out of the interface region into the flash 15 (FIG. 2) leaving a narrow fusion zone 16 that is substantially free of intermetallics. There is a relative displacement of 1.0 millimeter or so between the two conductors after the explusion of the material at the interface. The flash contains brittle intermetallic particles 17 but these do not affect the strength of the welded joint. The flash 15 is ordinarily not removed but may be trimmed off if desired.

A specific example of the practice of the invention is as follows. The materials laser welded were ETP copper and high conductivity aluminum conductors; the copper was 1.25 millimeters (0.050 inches) square and the aluminum had a diameter 1.35 millimeters (0.054 inches). The neodymium glass laser had a wavelength of 1.06 micrometers and was operated in pulse mode at 40 joules per pulse. The pulse width was 8 milliseconds and the contact load was 0.2-0.7 pounds developing a contact pressure of 100-350 psi. The Cu-Al interface was melted with the pulse laser while it was under the contact load. Most of the melted material was pushed out of the interface region leaving a narrow fusion zone.

Four different tests were performed to evaluate the quality of the laser welds, and these were tensile strength, relative impact strength, resistance vs. temperature variation, and electron microprobe tests. The tensile strength of copper-aluminum joint samples made at different contact pressures was measured on a tensile testing machine. Tensile failure occurred always in the aluminum (the weaker of the two materials) near the joint or at some distance away from the joint. Therefore, the joint is at least as strong as the weaker aluminum material. An impact tester was used to determine relative impact strength for different laser welding conditions. The welding conditions were with contact pressure, without contact pressure, copper-copper, and aluminum-aluminum. When no contact pressure was used, a small amount of energy was absorbed, indicating a brittle joint. When such joints were dropped on the floor, they failed at the weld indicating a high degree of brittleness. With the use of contact pressure, the amount of energy absorption increases for copper-aluminum laser welded joints and its order of magnitude was similar to the energy absorption for the copper-copper and aluminum-aluminum welded conductors. The relative energy absorption for the contact pressure condition was also several orders of magnitude larger than for the no contact pressure condition.

A third test was used to observe the joint resistance as a function of temperature cycling. The temperature was varied by passing a current through a string. The temperature was cycled from 50° C. to 180° C. for over 10,000 cycles with the cycle time being 2.5 min. The resistance of the string was measured before, during, and after the 10,000 cycles. There was no measurable change in resistance of the string. The resistance was measured with a double Wheatstone bridge circuit, and this test indicated that there was not any appreciable change in intermetallic thickness within the interface due to temperature changes. The temperature range chosen covers most ac motor operating temperatures.

The presence of intermetallics in the interface and in the flash was investigated by having an electron microprobe analysis performed on several samples. Weight and atomic concentrations were determined for single probes as well as step scans. Single probes were made in the various color bands found in the flash of the weld nugget. Three intermetallics were identified in the flash. Step scans were taken over the narrow interface region of a weld and no detectable intermetallic was present. Even though undetectable, intermetallics are present in the interface but they are too thin to affect the strength and electrical resistance of a joint.

Several advantages of laser welding are that no contact is required with the workpiece, the heat-affected zone is small, distortion and shrinkage of the weld are negligible, and a limited amount of texturing and cooling is required. Formation of unwanted intermetallics is alleviated or reduced below a critical layer thickness by laser welding with moderate contact pressure between the aluminum and copper conductors. The welded butt or corner joints have good tensile and impact strengths, low electrical resistance, and good electrical resistance stability after thermal cycling. These results are achieved while welding under ambient conditions.

While the invention has been particularly shown and described with reference to several preferred embodiments thereof, various changes in form and details may be made therein without departing from the spirit and scope of the invention.

The invention claimed is:

1. A method of welding an aluminum conductor to a copper conductor comprising the steps of: butting together the conductors with a contact pressure greater than 100 pounds per square inch and, while maintaining the contact pressure, delivering a single laser pulse to the aluminum-copper interface having a pulse width of approximately 8 milliseconds and a wavelength not exceeding 1.06 micrometers, said laser pulse having sufficient energy to heat and melt metal adjacent the interface and force molten material outwardly into a flash containing intermetallics while leaving a narrow fusion zone substantially free of intermetallics.

2. The method of claim 1 wherein the laser pulse is produced by focusing to a small spot a laser beam generated by a neodymium-doped yttrium aluminum garnet (YAG) or neodymium glass laser operated in pulsed mode.

3. The method of claim 1 wherein the conductor surfaces brought into butting engagement under contact pressure are unground and not perfectly flat.

4. A method of butt and corner welding a high conductivity aluminum conductor to an electrolytic tough pitch (ETP) copper conductor comprising the steps of: butting together the conductors with a contact pressure of 100–350 pounds per square inch and then delivering to the copper-aluminum interface a laser pulse with a pulse width of approximately 8 milliseconds and sufficient energy to heat and melt both metals and force molten material outwardly into a flash containing intermetallics and leaving a narrow fusion zone substantially free of intermetallics, said laser pulse having a wavelength not exceeding 1.06 micrometers.

5. The method of claim 4 wherein the surfaces of the aluminum and copper conductors brought into butting engagement are unground.

6. A method of butt welding a high conductivity aluminum conductor to an electrolytic tough pitch (ETP) copper conductor comprising the steps of: butting together unground ends of the conductors with a contact pressure of 100–350 psi and, while maintaining the contact pressure, delivering a single laser pulse to the aluminum-copper interface having a pulse width of approximately 8 milliseconds and a wavelength of 1.06 micrometers, said laser pulse having sufficient energy to heat and melt metal at the interface and force molten material outwardly into a flash containing intermetallics while leaving a narrow fusion zone substantially free of intermetallics.

* * * * *